July 20, 1965     A. KLUEBER ETAL     3,195,558
PROPORTIONING APPARATUS
Filed April 19, 1963     4 Sheets-Sheet 1
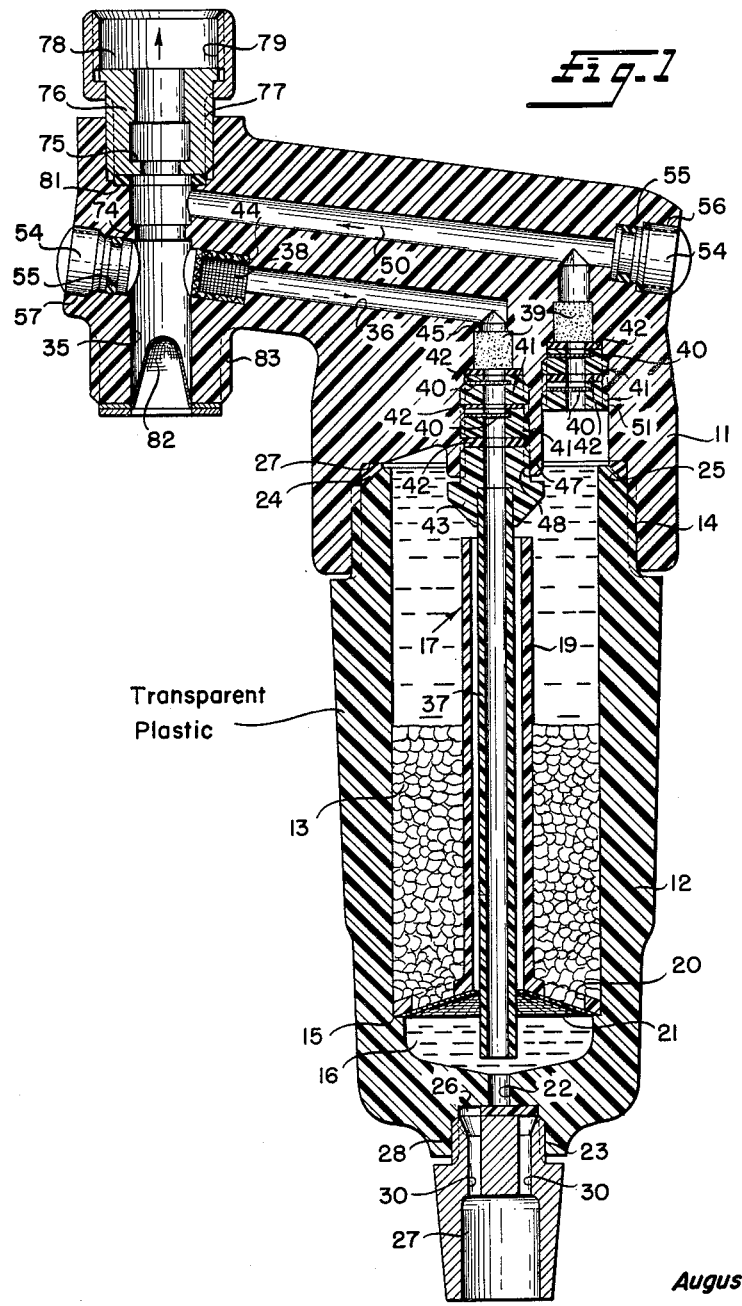
INVENTORS
*August Klueber*
*Franz J Ernst*
BY
ATTORNEY

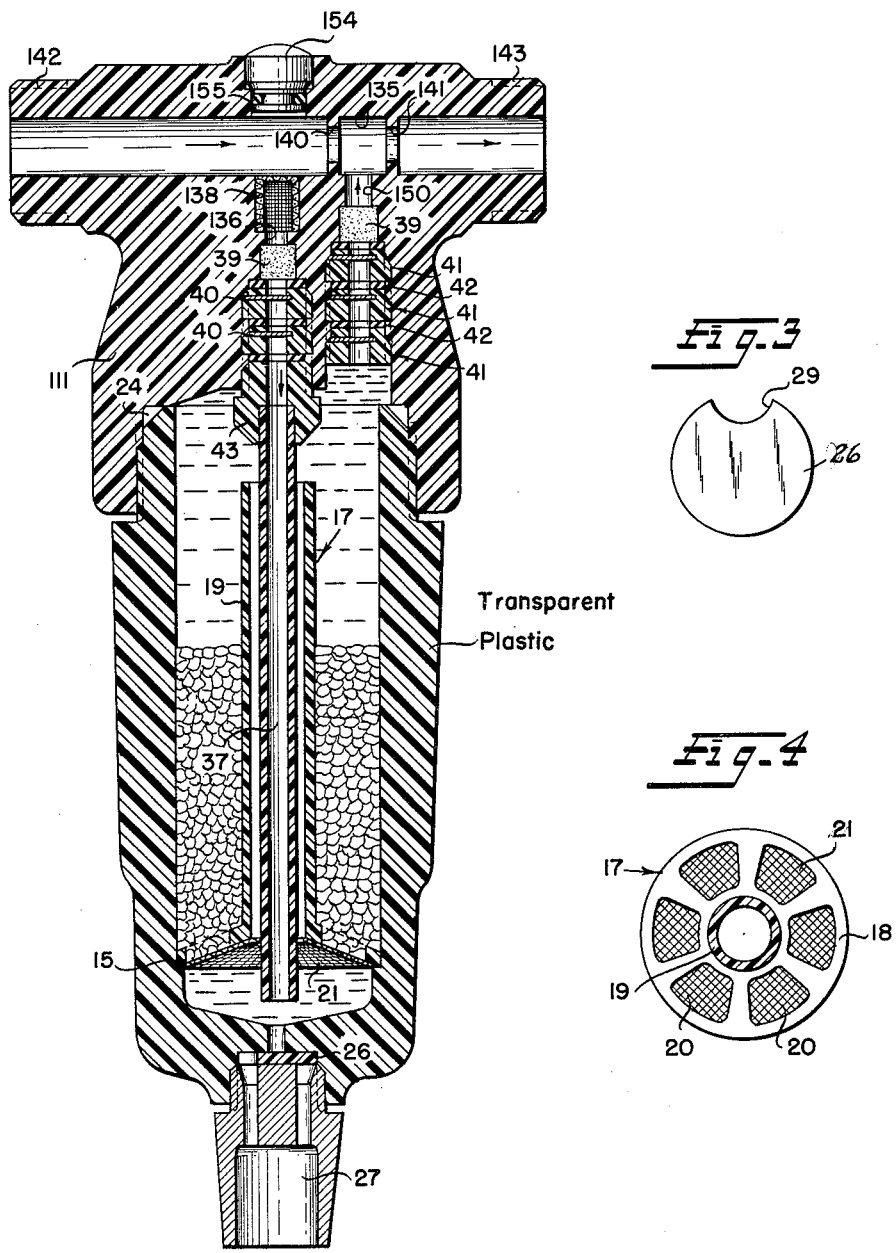

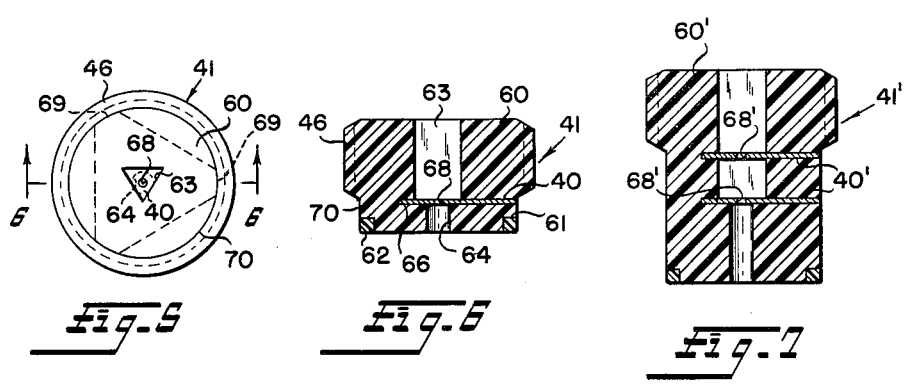
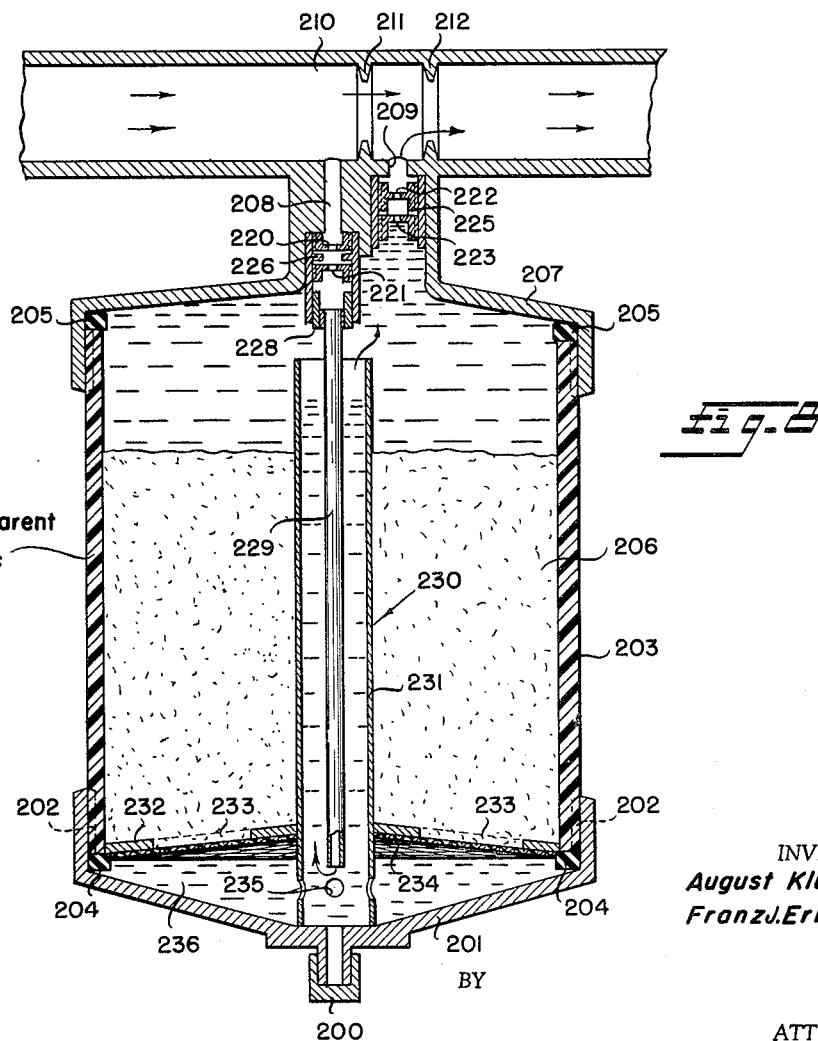

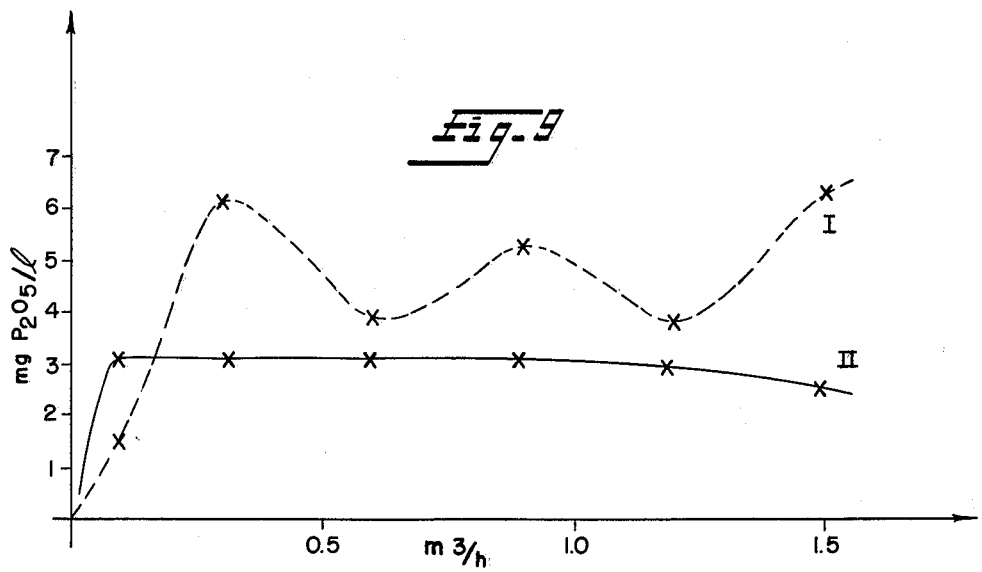
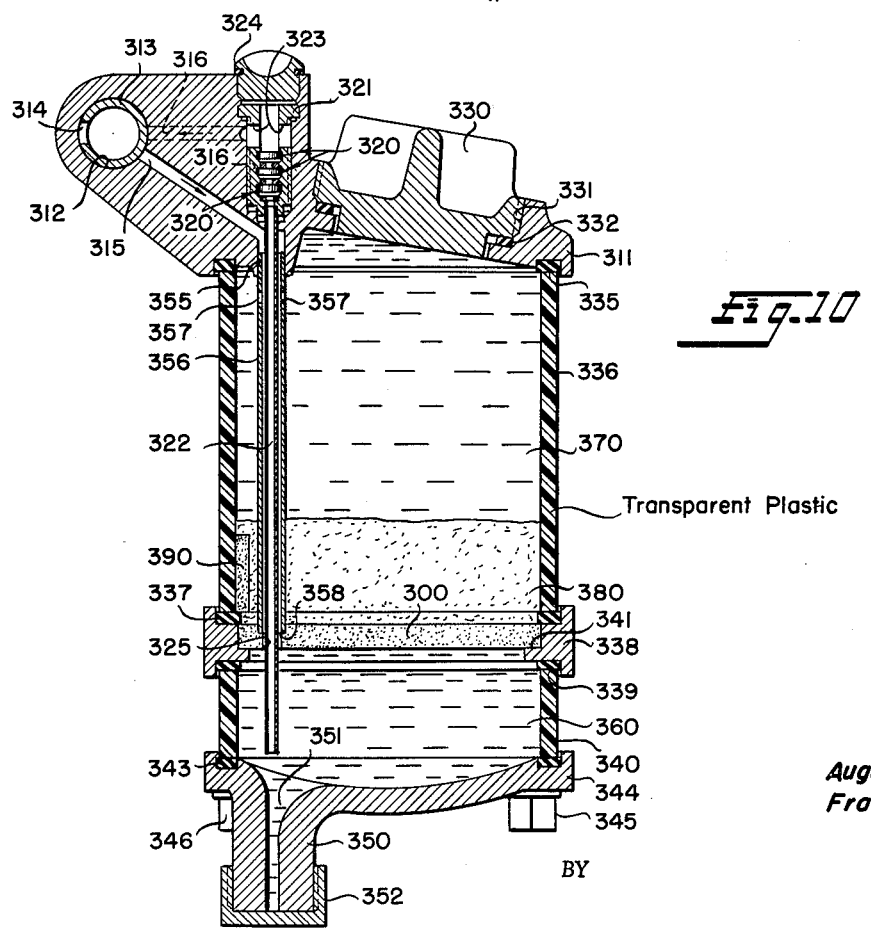

United States Patent Office 3,195,558
Patented July 20, 1965

3,195,558
PROPORTIONING APPARATUS
August Klueber, Landstrasse, Schriesheim, Baden-Wurttemberg, Germany, and Franz Josef Ernst, Neckargemuend, Baden-Wurttemberg, Germany; said Ernst assignor to said Klueber
Filed Apr. 19, 1963, Ser. No. 274,277
Claims priority, application Germany, Apr. 21, 1962,
K 46,549, K 46,607; May 18, 1962, K 41,420
12 Claims. (Cl. 137—268)

This invention relates to a dosing apparatus and, more particularly, to a proportioning or dosing apparatus having provisions for containing dissolvable solid substances and for adding desired amounts of solutions formed by dissolving such solid substances to a flowing liquid stream. The dissolving of the solid substances is accomplished by shunting-off or by-passing a portion of the total flow of the aforesaid liquid stream in such manner that the shunted portion of the flow is caused to pass through or otherwise contact and dissolve the solid substance contained in the dosing apparatus. After the solid substance is dissolved it is subsequently carried back to the main liquid stream by the shunted portion of the main flow.

One object of the invention is to provide a dosing apparatus capable of accurately adding predetermined amounts of dissolved solid substances to a flowing liquid stream.

Another object of the invention is to provide, in a shunt or by-pass flow type dosing apparatus, means for minimizing pressure fluctuations in the main stream flow by providing restrictions in the main flow line adjacent the locations where the shunt or by-pass flow leaves and re-enters the main flow. The aforesaid means for minimizing pressure fluctuations aid in achieving uniform addition of dissolved solid material to the main flow and thus aid in providing a reliable proportioning of dissolved material relative to main stream flow.

A still further object is to provide a dosing apparatus which incorporates novel dosage proportioning nozzles which act in conjunction with the main flow line restrictors to produce uniform dosing of the dissolved solid substances into the main flow line or stream. These nozzles, further, are of such nature that they are less subject to corrosion and the fouling caused thereby than previous similar nozzles.

Other objects of the invention are to provide novel means for supporting solid materials in a dosing apparatus, and to provide means for conducting the shunt or by-pass flow into contact with the solid dissolvable material contained in the dosing apparatus.

Another object of the invention is to provide a novel material supporting assembly which also serves as a shunt flow return tube.

Yet another object of the invention is to provide a dosing apparatus which is compact in size, whereby it can be conveniently used, for example, with small volume water flows such as occur in household hot water systems, and which, in addition, is simple to service.

Another object of the invention is to provide simple means for breaking any vacuum formed within the apparatus whereby re-filling of the device is simplified.

A further object is to provide a dosing apparatus in which the condition of the solid materials being dissolved and the shunt or by-pass flow passing through the apparatus may be readily observed.

A still further object of the invention is to provide, in one embodiment of the invention a porous plate which not only supports the material to be dissolved but in addition make possible the efficient dissolving of substances which heretofore have been relatively difficult to dissolve in apparatus of the general type disclosed.

These and other objects of the invention will be apparent from the remainder of the specification and from the drawings.

In the drawings which form a part of this application:
FIGURE 1 is a sectional view taken vertically through the center of one illustrative embodiment of the invention;
FIGURE 2 is a sectional view taken vertically through the center of another embodiment of the invention;
FIGURE 3 is a plan view of a gasket employed in both of the embodiments of the apparatus depicted in FIGURES 1 and 2;
FIGURE 4 is a plan view of a combination solid material supporting and shunt-flow directing strainer and tube assembly utilized in both of the embodiments of the apparatus depicted in FIGURES 1 and 2;
FIGURE 5 is a plan view to enlarged scale of one of the several identical dosage proportioning nozzles which are employed in both of the embodiments of the apparatus shown in FIGURES 1 and 2;
FIGURE 6 is a vertical sectional view taken on the line 6—6 of FIGURE 5;
FIGURE 7 is a vertical sectional view to enlarged scale and similar to FIGURE 6 showing another type of proportioning nozzle which may be substituted for the nozzle shown in FIGURES 5 and 6;
FIGURE 8 is a sectional view taken vertically through the center of a third embodiment of the invention;
FIGURE 9 is a graph which illustrates certain dosing or proportioning characteristics of our novel apparatus as compared with prior art devices; and
FIGURE 10 is a sectional view taken vertically through the center of a fourth embodiment of the invention.

Referring now to FIGURE 1 of the drawings, the embodiment of our dosing apparatus there shown comprises a head piece 11 and a cup-shaped vessel 12 for containing an initially solid material 13 which is to be dissolved into solution in the vessel and added in controlled amounts to a liquid stream. Head piece 11, as seen, is removably fastened to vessel 12 by means of complementary threads, shown schematically at 14, on head piece 11 and vessel 12, and fluid leakage between parts 11 and 12 is prevented by an annular gasket 24 interposed and compressed between a bevelled surface 25 at the top of vessel 12 and a cooperating shoulder 27 on head piece 11.

Both parts 11 and 12 are preferably formed of plastic material, with head piece 11 preferably being formed of non-transparent material and with vessel 12 preferably being formed of transparent material whereby the condition of the material within and the by-pass or shunt flow through vessel 12 may be readily observed. If substances sensitive to light are to be dosed, however, vessel 12 must be formed of dark or non-transparent material to inhibit or prevent undesirable alteration of such substances.

On the inside of vessel 12, near the lower end thereof, is formed an upwardly facing shoulder 15 which defines a recess 16 for a purpose to be described. Resting upon and extending upwardly from shoulder 15 is a solid material supporting and shunt-flow directing strainer and tube assembly, designated generally as 17, which, as best seen in conjunction with FIGURE 4, includes a hollow centrally apertured conically-shaped base portion 18 which is integrally joined to and in communication with an upstanding tubular portion 19. The inclined upper face of base portion 18 serves to channel upwardly air bubbles formed in this area during dosing operations. Through base portion 18 are formed a series of apertures 20, and to the under side of portion 18 is fastened screening material 21 which spans across the underside of each aperture 20. As seen in FIGURE 1 the upper face of the conically-shaped surface of base portion 18 and the top of screening 21 form the lower limit for the solid material 13 contained in vessel 12.

Near the bottom of vessel 12 is formed a vertically extending hole 22 which communicates with a counter-bore 23 formed in the lowermost portion of vessel 12. Located within counter-bore 23 in such position as to normally block fluid flow through drain hole 22 is a horizontally-oriented recess-including crescent-shaped gasket 26, also seen in FIGURE 3, which is normally held in sealing relationship with hole 22 by means of closure plug 27 which is attached to vessel 12 by means of complementary threads, shown schematically at 28, on vessel 12 and plug 27. The recess in gasket 26 is denoted 29.

Within plug 27 are formed one or more vertically extending holes 30 which, when plug 27 is loosened slightly from vessel 12 allows air to flow from the exterior of vessel 12 upwardly through holes 30, upwardly past the gasket 26 (which drops slightly when plug 27 is loosened) by way of recess 29 and upwardly through hole 22 into the interior of vessel 12 to break any partical vacuum which may have formed in vessel 12 during previous dosing operations. Breaking of the vacuum within vessel 12 by equalizing the pressures within and outside of vessel 12 allows vessel 12 to be easily removed from head piece 1 for refilling or cleaning. Of course, vessel 12 may also be depleted of fluid by loosening plug 27.

In head piece 11 are formed a network of channels, one of which denoted 35 is the main flow channel. Branching off channel 35 is an inlet shunt flow channel 36 which diverts a portion of the main line flow passing through channel 35 laterally and downwardly through head piece 11 and an inlet tube 37 associated therewith into the bottom part of vessel 12.

Provided in channel 36, as seen, are means for supporting the following elements and assemblies through which liquid shunted from the main flow channel must pass in traveling from the main flow channel 35 in the direction of the arrow before reaching tube 37: a cup-shaped filtering strainer 38; a cylindrical sponge inlay 39 which blocks any grit in the shunt flow from clogging the nozzles just downstream therefrom; one or more orifice-plate 40 including proportioning nozzles designated generally as 41; sealing gaskets 42; and an apertured plug 43 to which the top of inlet tube 37 is attached by adhesive or other means, not shown. Tube 37, and portion 19 of assembly 17, are preferably made of transparent colored plastics to render them more distinguishable. Strainer 38 is held in position in channel 36 by the fluid pressure of the shunt flow which forces it against a shoulder 44. Sponge 39 and upper gasket 42 are held in position because they are compressively fixed between a shoulder 45 and the upper nozzle 41 which carries external threads, shown schematically at 46 in FIGURES 1, 5 and 6, which mate with internal threads, shown schematically as 47, formed in head piece 11. The central gasket 42 is compressively held between the two identical nozzles 41 and the lower gasket 42 is compressively held between the lower nozzle 41 and plug 43 which is attached to head piece 11 by means of external threads 48 formed on the upper exterior portion of plug 43 which mate with threads 47.

Also communicating between the main flow channel 35 and the vessel 12 (through head piece 11) is a return or outlet shunt flow channel 50 the purpose of which is to return shunt fluid, which after passing through vessel 12 is a solution which carries dissolved dosing material, to the main flow channel 35. In passing through channel 50 in the direction of the arrow from vessel 12 to channel 35 shunt fluid passes through one or more nozzles 41, gaskets 42 and sponge 39 which are fixed in channel 50 in the same order and the same manner as their identical counterparts in channel 36 with the exception that the lowermost gasket 42 utilized in channel 36 is not required in channel 50. The internal threads in channel 50 corresponding to threads 47 in channel 36 are shown schematically as 51. The elements denoted 54 are each externally threaded plugs which are mated with internal threads in head piece 11 to form, in cooperation with their associated gaskets 55, closures for the access holes 56 and 57 which are required for the machining of portions of channels 50 and 36, respectively, and for the placement of strainer 38 in channel 36.

Nozzles 41, as best seen in FIGURES 5 and 6, are inverted from the showing in FIGURE 1 for illustration only and include a plastic base member 60 having an enlarged upper part upon the exterior of which are formed the threads 46, previously mentioned, and a lower smaller diameter part which is unthreaded, but which includes a groove 61 in which is mounted a sealing gasket 62. In the upper part of member 60 is formed a vertically extending polygonal, preferably triangular in cross-section, hole 63. In the lower smaller portion of member 60 is formed a vertically extending borehole 64 which communicates with hole 63. At the level of member 60 where holes 63 and 64 most closely approach each other is a horizontally oriented slit 66 which extends the majority of the distance across member 60, and in this slit is located a preferably triangular plate-like element 40, previously mentioned, which has centrally located therein a round exactly cailbrated proportioning orifice 68. The plate 40 and member 60 are so related that, when properly positioned, the corners 69 of the plate 40 coincide with the periphery 70 of the lower portion of member 60.

Plates 40 can be formed of noble metal, such as silver, or of other corrosion resisting materials such as slate, hardened plastic, minerals or the like. By mounting the plate 40 in a plastic body member the danger of corrosion, caused by the dissimilarity of metals between the nozzle and the remainder of a dosing apparatus which has occurred in prior art devices is substantially precluded. Thus the dosing apparatus can be used for the dosing of acid or basic substances.

The plates 40 most suitably have a thickness of between 0.1 mm. and 1.0 mm. preferably 0.25 mm. Where a soft metal such as silver is used to form the plates 40 the orifice 68 can be formed by punching.

Nozzles 41 may be formed either by separately machining and then joining the parts 40 and 60 or by machining part 40 and then moulding part 60 around part 40. Also, plate 40 can be other shapes than triangular, for example, quadrangular, in which case, if the nozzle assembly is cast it is desirable before molding to bend the edges of the square inwardly so that the plastic material may flow past and all around the plate in order to completely fill the mold cavity and thus form member 60 as desired.

If desired thread 46 on the nozzles 41 in channel 36 may be omitted since element 43 alone, is sufficient to hold these nozzles in their use position.

Nozzles 41, and particularly the orifice-including plates 40 thereof, it should be apparent, are for the purpose of regulating and stabilizing the amount of shunt flow which is diverted from the main flow to pass through the dosing apparatus which shunt flow, of course, controls in turn the amount of soluble material which is added to the main flow. More or less nozzles 41 then shown may be utilized in the dosing apparatus if it is desired to alter the proportion of dosing or soluble material to be added to the main flow. Also nozzles having differently sized proportioning orifices 68 can be installed in either or both of channels 36 and 50 if desired.

The holes 63 and 64 in the nozzles 41 are larger than needed for controlling proportioning and are not intended to control proportioning. Such control is dictated solely by the orifices 68.

A triangular or polyangular key or wrench dimensioned to fit snugly into bore 63 is utilized for placing nozzles 41 in or removing nozzles 41 from head piece 11.

In the present device, a main flow restrictor 74 is located in channel 35, between where the ends of channels 36 and 50 communicate with channel 35, and causes part of the main line flow (flowing in the direction of the arrow) to be diverted into channel 36 and thence to vessel 12. One disadvantage of previous shunt flow or by-pass type dosing apparatus which employed but a single main flow restrictor in the main flow channel (such as element 74 just mentioned) is lack of dosing precision due to pressure fluctuations in the main flow channel in the vicinity of the restrictor which cause non-uniform shunt flow into and out of vessel 12. With such prior art devices, in fact, dosing or proportioning precision has been found to vary from the desired by as much as 20%. In the present invention, we achieve a completely uniform dosing by adding a compensating restrictor 75 just downstream from the point where channel 50 enters the main flow channel 35. In the illustrated embodiment of FIG-URE 1 restrictor 75 is shown as being formed integral with a flanged nipple 76 which is fastened into the top left-hand portion of the head piece 11 by means of complementary threads schematically shown at 77, on the nipple 76 and the head piece 11. However, with slight modification of the head piece and nipple it should be obvious that the restrictor 75 could be formed integral with the head piece (just downstream of channel 50) as is restrictor 74.

Attached to flanged nipple 76 is a coupling 78 having internal threads, shown schematically at 79, for attaching the dosing apparatus to additional plumbing or to a device in which the dosed fluid eminating therefrom is to be utilized.

A gasket 81 seals the joint between the nipple 76 and the head piece 11, and a flange-including thimble-shaped strainer 82 filters main line flow entering the head piece 11. External threads shown schematically as 83, are provided adjacent strainer 82 on head piece 11 for attaching an incoming liquid supply line to the dosing apparatus.

In the operation of the apparatus, solid material to be dissolved and dosed or proportioned in a predetermined amount into a liquid stream is placed in vessel 12 by unscrewing vessel 12 from head piece 11, after breaking the vacuum in vessel 12, if necessary, by unscrewing plug 27. The solid material thus placed rests atop base portion 18 and screen 21 of assembly 17. Plug 27 is now retightened and vessel 12 is reattached to head piece 11.

Now, assuming that the apparatus is connected in a liquid line and liquid is flowing through channel 35 in the direction of the arrow therein, part of such liquid will be diverted, due to an increase in main line pressure upstream of restrictor 74, as a shunt flow into channel 36, then in sequence through sponge 39, nozzles 41, plug 43 and inlet tube 37 into recess 16 from whence it issues upwardly through screening 21 and apertures 20 into the solid material 13 which is to be dissolved and added to the liquid line. Upon contacting material 13 the incoming shunt flow begins to dissolve same and the initially dissolved-material-containing solution, which has a greater specific gravity than the incoming shunt flow descends and concentrates in recess 16 which is expediently arranged, it will be noted, below the lower ends of the apertures 20 in assembly 17. With this arrangement there is no possibility that subsequent shunt flow will pass through the apparatus without taking up some dosing-material since even if such shunt flow were to proceed directly from the outlet of 37, up through the interior of portion 19 and out channel 50 it would still have to pass through and be adulterated by the dosing solution in recess 16.

Continuing shunt flow entering vessel 12 through tube 37 will soon fill vessel 12 and shortly, such shunt flow, now containing dissolved soluble dosing material, will begin to depart the vessel by way of channel 50 which returns the dissolved material-containing shunt flow to the main line flow in channel 35. Upon re-entry to the main line flow the dissolved material-containing shunt flow mixes with and doses the main line flow whereby main flow leaving nipple 76 contains dissolved soluble material in the proportion desired.

Referring now to FIGURE 7 there is seen an alternate type of nozzle 41' which may be used in lieu of or in addition to the nozzles 41. Nozzle 41' is similar to nozzle 41 and differs from nozzle 41 only in that portion 60' thereof has been dimensioned to include space for two spaced-apart orifice-including plates 40'. The accurately dimensioned proportioning orifices in plates 40' are denoted 63'. The plates 40' in nozzles 41' are spaced apart from 4 mm. to 15 mm., preferably about 6 mm.

By utilizing nozzles 41 or 41' alone or in various combinations a great variety of orifice plate spacings may be achieved. Even a greater number of possible spacings may be achieved by employing additional gaskets, such as gaskets 42 between adjacent nozzles. However, no matter whether nozzles are utilized alone or in combination with one or more to comply with the thickness range set forth hereinabove and the distance between the various orifice plates in adjacent nozzles should also conform to the limits noted hereinabove. It is desirable to form all of the gaskets employed in the dosing apparatus, but especially those used between adjacent nozzles, of elastic material so that positive sealing of all gasketed joints is achieved and, in the particular case of the nozzle gaskets, so no vagabond water passes by threads 46 and 46'. With the use of either nozzles 41 or 41' the burner nozzle assembly formerly employed with devices of the subject type is no longer necessary.

Referring now to the embodiment of the invention shown in FIGURE 2, several of the elements shown therein are identical in structure and function to already described elements in the embodiment of FIGURE 1. For this reason, the same reference numerals have been applied to corresponding elements in both FIGURES 1 and 2 and further description of these identical elements is not believed necessary.

In FIGURE 2 the head piece is denoted 111, the main flow channel in the head piece 111 is denoted 135, the inlet shunt flow channel is denoted 136, and the return or outlet shunt flow channel is denoted 150. The arrows show the direction of liquid flow through the just-named channels. The cup-shaped filter strainer 138 in channel 136 and the elements 154 and 155 in FIGURE 2 are identical to and function the same as their counterpart elements 38, 54 and 55, respectively, in the embodiment of FIGURE 1. To minimize pressure fluctuations in channel 135 main flow restrictor 140 and compensating restrictor 141 are formed on the head piece and jut into channel 135 just up and downstream, respectively, from where channel 150 enters channel 135.

It will be noted that there is one more nozzle 41 in channel 136 of FIGURE 2 than in channel 36 of FIG-URE 1. This extra nozzle has been shown thusly merely to indicate how various nozzle arrangements can be used to achieve certain results desired.

At 142 and 143 in FIGURE 2 are schematically shown external thread means on the head piece 111 whereby the apparatus can be connected into a flow line and/or to a device to be serviced by the dosing apparatus.

The operation of the embodiment of FIGURE 2 is substantially identical to the operation of the embodiment of FIGURE 1 so that the previous description of operation will not be repeated. As should be evident from FIG-URES 1 and 2 the device of FIGURE 1 is best suited for attachment to a vertically oriented fluid line and the device of FIGURE 2 is best suited for attachment to a horizontally oriented flow line.

FIGURE 8 shows in substantially schematic form a third embodiment of the invention which is quite similar in most respects to the embodiment of FIGURE 2, but which differs therefrom in certain respects to be described hereinbelow. Since the embodiment of FIGURE 8 is quite similar to the embodiment of FIGURE 2 the following elements will merely be catalogued to save repetition since it is believed that their structure and function will be clear from the previous description: 200 is a closure cap which serves as a vacuum breaker; 201 is a vessel bottom closure fastened by means of threads 202 to a tubular vessel wall-forming member 203 the bottom of which is closed by 201; 204 and 205 are sealing gaskets; 206 is material to be dosed into a flow line; 207 is a head piece which closes the top of 203 and provides an inlet shunt flow channel 208, and outlet or return shunt flow channel 209 and a main flow channel 210; 211 and 212 are, respectively, the main flow and compensating restrictors in the main flow channel 210, equivalent to restrictors 140 and 141 in the apparatus of FIGURE 2; at 220, 221, 222 and 223 are schematically shown proportioning nozzles equivalent to the nozzles 41 or 41′ previously described; 225 and 226, respectively, are removable adaptor fittings for removably fastening the various nozzles in the head piece 207; 228 is a removable adaptor fitting for attaching inlet tube 229 to adaptor 226 and, thus, to the head piece 207; and 230 denotes generally a solid-material supporting and shunt-flow directing strainer and tube assembly, similar to assembly 17 in FIGURE 1. However, in contrast to FIGURE 1, in the present embodiment the tubular portion 231 of the assembly extends below as well as above the base portion 232 and is supported by the top of vessel bottom closure 201. Base portion 232 surrounds and is preferably fastened to portion 231. The numeral 233 denotes apertures through base portion 232 equivalent to the apertures 20 in the FIGURE 1 apparatus and 234 denotes screening covering the bottom side of portion 232 and the bottom ends of apertures 233 in the same fashion as screening 21 covers the apertures in the lower end of tubular portion 231 which allow solution from area 236 to enter the interior of portion 231 and concurrently also allows some of the inlet shunt flow to pass into area 236.

The arrows show the main flow paths taken by liquid passing through the apparatus of FIGURE 8 and, since the basic mode of operation of this embodiment is substantially identical to the operation of the embodiments of FIGURE 2, further description of such operation is believed unnecessary. However, it should be noted that in this embodiment gasket 204 seals not only the threads 202, but also supports to some degree the peripheral edge of base portion 232.

Nozzles 220, 221 and 222, 223, respectively, are arranged, in this particular embodiment, in series with a spacing between adjacent nozzle orifices of about 5 mm., in order to achieve by equal pressure decreasing at the outlet large cross section at the nozzles.

The nozzles employed to achieve any particular desired dosing proportion in any of the embodiments of the invention may be chosen empirically based upon the rate of liquid flow to the apparatus, the effect of the main and compensating restrictions and the size of nozzle orifices.

FIGURE 9 shows graphically in the curve denoted I the non-uniform dosing or proportioning, caused by pulsations in the main flow line pressure of a solution of polymer phosphate into the main flow line 210 achieved by an apparatus like the apparatus of FIGURE 8 except without compensating restriction 212. Curve II in FIGURE 9 shows the considerably more uniform dosing achieved by the apparatus of FIGURE 8 which includes both the main flow restrictor 211 and the compensating restrictor 212. The tests which led to the results depicted in FIGURE 9 were conducted with restrictors 211 and 212 each having inside diameters of 7 mm. and with flow rates therethrough of between 0.1 and 1.5 m.$^3$/h. The inside diameter of each of the orifices in the nozzles employed in this testing was 0.25 mm. Comparison of both curves I and II shows clearly how pulsations in main line pressure resulting from the use of only the restrictor 211 cause dosing fluctuations of about +20% of the dosing quantity desired. However, with both restrictors 211 and 212 present in the apparatus the dosing rate is kept substantially constant.

In FIGURE 10 is shown a fourth embodiment of the invention which is particularly useful for dosing substances, for example, polymer phosphates, which tend to stick together and form a clod which is hard to dissolve by shunt flow in the embodiments of the apparatus previously described. In the instant embodiment this clodding is substantially prevented by replacing the conically shaped material-supporting base portions seen in the previous embodiments with a porous partition plate or stone denoted 300 upon which the substance which is to be dissolved is poured. Plate 300 can be made of ceramic frit, silicates bound with plastics, joined carbon filter material, joined particles of silicon carbide, or pressed and joined fibres of glass, metal, textiles or the like. The pore sizes of the plate 300 may range between 5 to 2000$\mu$, preferably 10 to 100$\mu$. However, a pore size of 20 to 50$\mu$ has been found to be especially suitable.

The apparatus in FIGURE 10 has been found to be especially suited for dosing pulverized polymer phosphates into water flowing through the apparatus.

Again, as was done in describing the embodiment of FIGURE 8, only a catalogue of parts will be set forth since the general structure of the apparatus of the invention should now be readily understood in light of the previous description.

Element 311 is a head piece which is provided with a main flow channel 312 through which liquid passes in a direction away from the viewer (into the paper), and jutting into which are a main flow restrictor 313 show partially broken away at its left-hand side to reveal a compensating restrictor 314 equivalent to the restrictors 211 and 212, respectively, in the embodiment of FIGURE 8. Restrictor 313 is just downstream from the point at which an inlet shunt flow channel 315 branches off of channel 312 and is just upstream of the point at which an outlet shunt flow channel 316 (shown partially in hidden lines) joins channel 312. Restrictor 314 is located just downstream of the point where channel 316 joins channel 312. The arrows denote the direction of flow through channels 315 and 316.

No nozzles are located in the inlet shunt flow channel 314 in this embodiment of the invention. However, as seen, three nozzles 320, which are like the nozzle 41 in FIGURE 1, are located in channel 316 and are removably supported therein by means of a removable adapter 321 which also supports the upper end of an outlet flow tube 322, the lower end of which extends downwardly through an aperture 325 in plate 300. The numeral 323 denotes apertures in adapter 321 through which dosed fluid flows outwardly to channel 312, by way of channel 316, after having passed through the nozzles 320. At 324 is seen a gasketed closure plug equivalent to elements 54, 55 in FIGURE 1.

An externally threaded cover 330 is normally fastened in and closes internally threaded aperture 331 in head piece 311, but is removed when phosphates or other dosing material to be poured into plate 300 in filing the apparatus. Numeral 332 denotes a sealing gasket.

Head piece 311 is mounted on a recessed sealing gasket 335 lying atop the upper edge of an upper tubular transparent wall-forming member 336. Member 336, in turn is mounted atop a sealing gasket 337 which lies in a recess on the upper side of a plate supporting member 338 which, further, has an internal ledge 339 at about its mid-height upon which is supported plate 300. In a recess on the underside of member 338 lies sealing gasket 339 which, in turn, lies atop the upper edge of a lower tubular transparent wall-forming member 340. Member 340 bears at its bottom edge on a sealing gasket 343 which is carried in an annular recess formed in the upper side of a bottom closure member 344. The shanks (not shown) of long headed screws 345 and 346 pass upwardly through apertures (not shown) in member 344 and the top ends of these screws are engaged in threaded holes (not shown) in the bottom of head piece 311 and serve to hold elements 311, 335, 336, 337, 338, 339, 340, 343 and 344 in their assembled relationship.

Integral with and depending from the bottom of closure member 344 is a protrusion 350 in which is formed a channel 351 which serves as a vacuum breaking line and as a means for emptying or partially depeleting the interior contents of the apparatus when a threaded cap 352 normally attached to the lower threaded end thereof is removed.

Attached to and extending from a recess 355 in the bottom of head piece 311 is a shunt flow inlet tube 356. Recess 355, as seen, is in communication with inlet shunt flow channel 315, and tube 356, as seen, is concentric with, but slightly spaced outwardly from outlet flow tube 322. Near the top end of tube 356 are formed a plurality of apertures 357, and the bottom end of tube 356 rests on a ledge 358 formed at the upper end of aperture 325 in plate 300.

The porous plate 300 which in the illustrated embodiment is made of fritted silicate material and has a pore size of about 30µ and a total thickness of about 10 mm. divides the interior of the dosing apparatus of FIGURE 10 into a solving or solution evolving section 360 and a phosphate containing section 370.

In operation, liquid, for example a portion of fresh water flowing through channel 312, is shunted into channel 315, into recess 355 and thence into tube 356 and out apertures 357 thereby filling section 370. Con-currently other fresh water entering tube 356 flows downwardly between tubes 322 and 356 into section 360 filling it also. A part of the water flowing into section 360 circulates upwardly through section 360, through plate 300 and dissolves some of the phosphate on the underside of the phosphate material 380 which rests atop plate 300. As the phosphate goes into solution it raises the specific gravity of the water in which it is dissolved and such water then sinks back through plate 300 into section 360. Thus, little by little, a rather highly concentrated phosphate solution collects in section 360. As additional shunt flow enters the interior of the apparatus the more or less concentrated solution in section 360 is eventually forced into up tube 322, through nozzles 320, apertures 323 and return channel 316 back into the main flow in channel 312 downstream of the compensating restrictor 314. Thus a phosphate-water solution of desired proportion is made available for whatever use is desired. It will be noted that the direction of shunt flow through the inlet and outlet tubes in FIGURE 10 is in the opposite direction of the shunt flow in such tubes in the other embodiments.

If it be desired to accelerate the dissolving process within section 370 porous strips such as 390, or cylinders, or the like, of the same or similar material as the plate 300 can be inserted adjacent the inner wall of member 336. Strips 390 expedite dissolving of the material 380 by causing a small portion of the shunt flow to come into contact with the material 380 adjacent the strips. The shunt flow is caused to traverse the strips or cylinders and to subsequently act on the material 380 due to capillary action.

Although the embodiment of FIGURE 10 is principally intended for the dosing of phosphates to water, such embodiment and the dosing method utilized therein is also applicable for other substances. The type of porous plate to be used in the just described apparatus depends upon the chemical structure of the substance to be dosed and the liquid in which such substance is to be dissolved and is chosen in accordance with known filtering techniques. In order to achieve the necessary pore size and pore volume, respectively, these plates or stones may be made of material with different granulation. The grains can be fastened by fritting or by binding agents.

Having now described our invention, what we claim as new and desire to secure by Letters Patent is:

1. A proportioning apparatus of the type in which a shunt flow is diverted from a main flow, to material to be dissolved, and then returned as a material-containing solution into the main flow comprising: a head piece including first channel means, having an upstream end and a downstream end, for conducting a main flow and other channel means for conducting shunt flow to and from said main flow; vessel means attached to said head piece, the interior of said vessel being in fluid communication with said shunt flow-conducting channel means; means within said vessel for supporting material to be dissolved; additional means within said vessel for conducting said shunt flow from and toward said shunt flow-conducting channel means in such manner that said shunt flow engages and dissolves said material and adds the solution thus formed to said main flow; and at least two stationary restrictor means in said main flow channel means for controlling pressure fluctutions in said main flow, said restrictor means each being located wholly downstream from the location where the other channel means for conducting shunt flow from said main flow intersects said main flow and said restrictor means being present in addition to any means used to couple or any means used to seal any joint between said main flow channel means and any additional main flow-conducting elements.

2. The combination of claim 1, said first and other channel means comprising a main flow channel; a shunt flow inlet channel having an inlet port communicating with said main flow channel; and a shunt flow outlet channel having an outlet port communicating with said main flow channel; one of said restrictor means being located wholly between said inlet and outlet ports.

3. The combination of claim 1; said first and other channel means comprising a main flow channel; a shunt flow inlet channel having an inlet port communicating with said main flow channel; and a shunt flow outlet channel having an outlet port communicating with said main flow channel; one of said restrictor means being located wholly downstream from said outlet port.

4. The combination of claim 1, said first and other channel means comprising a main flow channel; a shunt flow inlet channel; and a shunt flow outlet channel; said restrictor means each extending inwardly toward the axis of said main flow channel and having a circular orifice therein; and including a proportioning nozzle assembly located in at least one of said shunt flow channels.

5. The combination of claim 4, said nozzle assembly including a body portion having bore means adapted to receive an assembling key.

6. The combination of claim 1, said first and other channel means comprising a main flow channel; a shunt flow inlet channel having an inlet port communicating with said main flow channel; and a shunt flow outlet channel having an outlet port communicating with said main flow channel; a first of said restrictor means being located in said main flow channel between said inlet and outlet ports, and a second of said restrictor means being located in said main flow channel downstream from said outlet port.

7. The combination of claim 6 including: a shunt flow inlet tube attached to said head piece, said shunt flow inlet tube being in fluid communication with said shunt flow inlet channel; and a shunt flow outlet tube located within said vessel, one of said tubes surrounding at least a portion of the other of said tubes.

8. The combination of claim 7 wherein said vessel means depends from said head piece and includes a bottom, said material supporting means being supported by said vessel means in spaced relation to said bottom and surrounding at least one of said tubes.

9. A proportioning apparatus of the type in which a shunt flow is diverted from a main flow, to material to be dissolved, and then returned as a material-containing solution into the main flow comprising: a head piece including channel means for conducting a main flow and for conducting a shunt flow to and from said main flow; vessel means attached to said head piece, the interior of said vessel being in fluid communication with said shunt flow-conducting channels; means within said vessel for supporting material to be dissolved; additional means within said vessel for conducting said shunt flow from and toward said shunt flow-conducting channel means in such manner that said shunt flow engages and dissolves said material and adds the solution thus formed to said main flow; said additional means further comprising a rigid shunt flow inlet tube attached to said headpiece, said shunt flow inlet tube being in fluid communication with said channel means which conduct the shunt flow from the main flow; and a rigid shunt flow outlet tube located within said vessel, one of said tubes surrounding at least a portion of the other of said tubes.

10. The combination of claim 9 wherein said material supporting means surrounds at least one of said tubes.

11. The combination of claim 10, said material supporting means comprising an upright frusto-conically shaped strainer supported by said vessel means and engaged with and surrounding said outlet tube.

12. The combination of claim 10, said material supporting means comprising a porous plate supported by said vessel means and engaged with and surrounding said outlet tube.

References Cited by the Examiner

UNITED STATES PATENTS

| | | | |
|---|---|---|---|
| 1,382,633 | 6/21 | De Vito | 23—272.8 |
| 1,769,428 | 7/30 | Gatchet | 23—272.7 |
| 2,235,278 | 3/41 | Brunner | 23—272.7 |
| 2,589,595 | 3/52 | Aske | 23—272.7 |
| 2,758,877 | 8/56 | Gleason | 23—272.7 |
| 2,889,995 | 6/59 | Borell | 137—205.5 |
| 3,060,956 | 10/62 | Menzie | 137—205.5 |
| 3,084,712 | 4/63 | Brown | 23—272.7 |

M. CARY NELSON, *Primary Examiner.*

HENRY T. KLINKSIEK, *Examiner.*